J. W. TRAMMELL & H. H. HAMMACK.
PLANTER.
APPLICATION FILED SEPT. 20, 1909.

942,760.

Patented Dec. 7, 1909.

Witnesses

Inventors
James W. Trammell and
Hope H. Hammack
By C. A. Snow & Co.
Attorneys

UNITED STATES PATENT OFFICE.

JAMES W. TRAMMELL AND HOPE H. HAMMACK, OF SUMNER, GEORGIA.

PLANTER.

942,760.    Specification of Letters Patent.    Patented Dec. 7, 1909.

Application filed September 20, 1909. Serial No. 518,725.

*To all whom it may concern:*

Be it known that we, JAMES W. TRAMMELL and HOPE H. HAMMACK, citizens of the United States, residing at Sumner, in the county of Worth and State of Georgia, have invented a new and useful Planter, of which the following is a specification.

This invention has relation to corn and pea planters and it consists in the novel construction and arrangement of its parts as hereinafter shown and described.

The object of the invention is to provide mechanism of novel and simple arrangement adapted to transmit movement from the supporting wheel of a planter to the dropper thereof and with this object in view the mechanism includes a lever fulcrumed to the beam of the planter and adapted to be engaged by offsets or lugs mounted upon the planter wheel and which in turn is operatively connected with a lever fulcrumed upon the planter beam in such manner that it may slide longitudinally. The last said lever is operatively connected with the slide or dropper located in the hopper of the planter and the said slide or dropper is so arranged as to lift the seed and deposit the same in a chute through which they are conducted to the ground.

Figure 1:
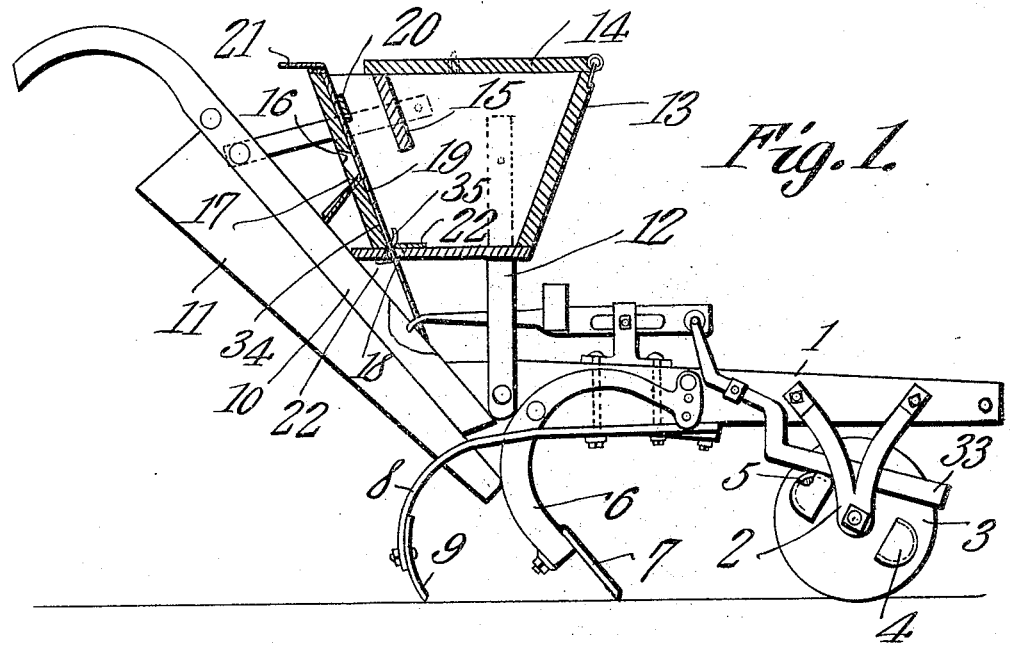
Figure 2:
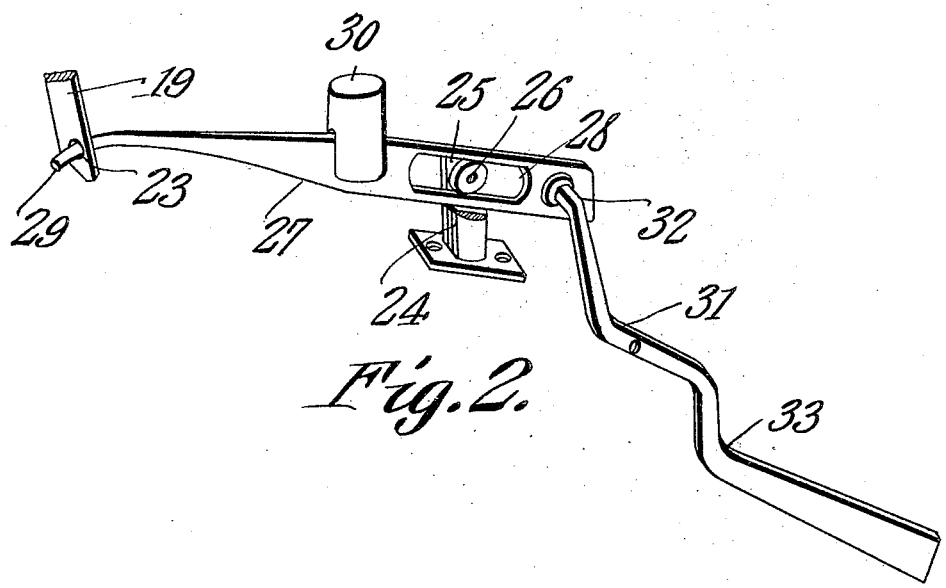

In the accompanying drawings:—Figure 1 is a side elevation of the planter with parts broken away and parts in section. Fig. 2 is a perspective view of the dropper operating mechanism with parts broken away.

The planter includes a beam 1 from the forward end of which depends a bracket 2. A supporting wheel 3 is journaled for rotation in the bracket 2 and is provided upon its side with a series of offsets or lugs 4. In the drawing two of the said lugs are shown but the number may be increased or diminished as desired. The said lugs are provided upon their outer sides with grooves 5, the object of which will be explained hereinafter. A standard 6 is attached to the beam 1 and carries a furrow opening plow 7. Spring standards 8 are also attached to the beam 1 and carry furrow closing plows 9. Handles 10 are attached to the rear end of the beam 1 and support a chute 11, the lower end of which is located behind the furrow opening plow 7 and in front of the furrow closing plows 9. Uprights 12 are mounted upon the beam 1 and at their upper portions support a hopper 13.

The hopper 13 is provided with a hinged top 14 and in its interior with a partition 15 located in the vicinity of its rear side and near its upper edge. The hopper 13 is provided in its rear side and at a point approximately midway between its upper and lower ends with an opening 16 and from the lower edge of the said opening is disposed a chute 17 which is directed toward the chute 11. The hopper 13 is provided at its bottom and in the vicinity of the lower edge of its rear side with an opening 18 and a slide or dropper 19 passes through the said opening 18 and lies against the inner edge of the opening 16. A guide 20 is located in the hopper 13 and a slide 19 passes under said guide. The upper end of the slide 19 is rearwardly disposed as at 21 and is adapted to extend over the upper edge of the rear side of the hopper 13. Wear plates 22 are provided upon the bottom of the hopper 13 at opposite sides of the opening 18 and serve as means for holding the lower portion of the slide 19 in proper position in the opening 18. Other wear plates may be provided if desired. The slide 19 is provided at its lower end with an opening 23. A stud 24 is mounted upon the beam 1 and at its upper end is provided with a recess 25 in which is journaled a roller 26. A lever 27 is provided with an elongated opening 28 which receives the roller 26 located in the recess 25 of the stud 24. The rear end of the lever 27 is slightly curved as at 29 and projects through the opening 23 in the slide 19. A weight 30 is mounted upon the lever 27 at a point between the stud 24 and the curved end 29.

A lever 31 is fulcrumed to the side of the beam 1 and at its upper end is provided with a laterally disposed extremity 32 which has pivotal connection with that end of the lever 27 opposite the end thereof provided with the curved portion 29. The lever 31 is provided with a downwardly disposed forward end portion 33 which lies in the path of movement of the offsets or lugs 4 mounted upon the side of the wheel 3. When the lugs 4 engage the forward portion 33 of the lever 31 the lower edge of the said portion enters the groove 5 and thus the lever 31 is steadied against lateral vibration.

The operation of the planter is as follows: Seed is placed in the hopper 13 and as the planter is drawn along the ground the plow 7 will open a furrow. At the same time the offsets 4 carried by the wheel 3 will engage the forward portion 33 of the lever 31 and rock the said lever upon its fulcrum. This movement upon the part of the lever 31 will rock the lever 27 upon the roller 26 as a fulcrum and at the same time the said lever 27 will move longitudinally with relation to the stud 24. As the lever 27 rocks as indicated the slide 19 is moved vertically in the hopper 13. The slide 19 is provided at a point between its ends with an opening 34 which when the said slide moves to an elevated position is adapted to register with the opening 16 in the rear wall of the hopper 13. At the lower edge of the opening 34 is mounted a lug 35 the end of which is disposed in an upward direction above the lower edge of said opening 34. When the slide 19 is in a lowered position in the hopper 13, the opening 34 receives seed and said seed are held in the opening by the lug 35. When the slide 19 is moved into an elevated position and the opening 34 is brought into register with the opening 16 the seed carried in the opening 34 falls through the opening 16 and passes along the chute 17 into the chute 11 from which it falls to the ground in the furrow opened by the furrow-opening plow 7 and when so deposited is covered by the covering plows 9. When the opening 34 arrives in register with the opening 16 in the rear side of the hopper 13 and the said opening 34 contains seed as indicated the lug 35 has a tendency to push the seed contained within the opening 34 through the same and into the opening 16 in the rear of the hopper 13.

Thus it will be seen that a simple and an effective dropper operating mechanism is provided and that the parts are compactly assembled. It is of course understood that as the lugs 4 engage the forward end of the lever 31 the said forward end of the said lever is elevated and the rear end thereof is lowered consequently the forward end of the lever 27 is lowered and the rear end thereof is raised. When the lug 4 passes beyond the end of the lever 31 the forward end thereof is caused to descend by reason of the fact that the weight 30 forces the rear end of the lever 27 down and its forward end up therefore the rear end of the lever 31 is elevated. By providing the weight 30 upon the lever 27 the parts of the dropper-operating mechanism will operate without undue vibration or rattling.

Having described our invention, what we claim as new and desire to secure by Letters Patent is:—

1. A planter comprising a wheel-supported beam, a hopper mounted thereon, a reciprocating slide mounted in the hopper, levers fulcrumed upon the beam and operatively connected together one of the said levers being slidably mounted with relation to its fulcrum, one of the levers being operatively connected with the slide and the other adapted to be operated by the wheel.

2. A planter comprising a wheel-supported beam, a hopper mounted thereon, a slide mounted for reciprocation in the hopper, levers fulcrumed upon the beam and operatively connected together, one of the said levers being weighted at one end and slidably mounted with relation to its fulcrum and operatively connected with the slide in the hopper and the other lever adapted to be operated by the wheel.

3. A planter comprising a wheel-supported beam, a hopper mounted thereon, a slide mounted for reciprocation in the hopper, levers fulcrumed to the beam and operatively connected together one of the levers having sliding engagement with said slide and the other lever adapted to be operated by the wheel.

4. A planter comprising a wheel-supported beam, a hopper mounted thereon, a slide mounted for reciprocation in the hopper and having a feed opening, a lug carried by the slide and located adjacent the lower edge of the opening therein, levers fulcrumed upon the beam and operatively connected together one of the said levers having sliding engagement with the said slide and the other adapted to be operated by the wheel.

In testimony that we claim the foregoing as our own, we have hereto affixed our signatures in the presence of two witnesses.

JAMES W. TRAMMELL.
HOPE H. HAMMACK.

Witnesses:
H. S. JONES,
IBBIE G. PEARCE.